(12) United States Patent
Loprieno et al.

(10) Patent No.: US 8,462,784 B2
(45) Date of Patent: Jun. 11, 2013

(54) SECURITY APPROACH FOR TRANSPORT EQUIPMENT

(75) Inventors: Gilberto Loprieno, Milan (IT); Fabio Maino, Palo Alto, CA (US)

(73) Assignee: Cisco Technology Inc., San Jose, CA (US)

( * ) Notice: Subject to any disclaimer, the term of this patent is extended or adjusted under 35 U.S.C. 154(b) by 1492 days.

(21) Appl. No.: 11/796,362

(22) Filed: Apr. 27, 2007

(65) Prior Publication Data
US 2008/0270785 A1 Oct. 30, 2008

(51) Int. Cl.
*H04L 12/28* (2006.01)

(52) U.S. Cl.
USPC .......................................................... 370/392

(58) Field of Classification Search
USPC ........................................ 370/392, 328, 252
See application file for complete search history.

(56) References Cited

U.S. PATENT DOCUMENTS

| | | | |
|---|---|---|---|
| 6,226,277 B1 * | 5/2001 | Chuah | 370/328 |
| 6,687,232 B1 * | 2/2004 | Farnsworth | 370/252 |
| 6,920,149 B2 | 7/2005 | Robledo et al. | |
| 7,023,881 B1 * | 4/2006 | Bendak et al. | 370/470 |
| 7,106,862 B1 * | 9/2006 | Blair et al. | 380/256 |
| 7,603,549 B1 * | 10/2009 | Kay | 713/160 |
| 7,746,853 B2 * | 6/2010 | Zhang | 370/389 |
| 2005/0125840 A1 | 6/2005 | Anderson et al. | |
| 2005/0135390 A1 | 6/2005 | Anderson et al. | |
| 2005/0144225 A1 | 6/2005 | Anderson et al. | |
| 2005/0163116 A1 | 7/2005 | Anderson et al. | |

* cited by examiner

*Primary Examiner* — Mark Rinehart
*Assistant Examiner* — Mohammad Anwar
(74) *Attorney, Agent, or Firm* — Hickman Palermo Truong Becker Bingham Wong LLP

(57) ABSTRACT

An apparatus comprising encryption logic that provides security for fiber-based communications may be implemented in accordance with an embodiment of the present invention. A data super frame is created by the encryption logic to comprise two or more data frames. Each of the data frames contains a payload portion. The encryption logic may receive one or more data payloads that are associated with a client signal. Using a single set of security control parameters, the encryption logic encrypts and stores a different encrypted payload in a payload portion of a different frame of the data frames in the data super frame. Instead of storing the set of security control parameters in a single data frame, the encryption logic stores the set of security control parameters in different sets of unused bytes associated with at least two different frames of the data frames.

24 Claims, 6 Drawing Sheets

SECURITY APPROACH FOR TRANSPORT EQUIPMENT

TECHNICAL FIELD

The present disclosure relates generally to network communications.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Fiber is an optimal medium for transmitting signals. A strand of fiber is capable of carrying an enormous amount of information using light waves of multiple wavelengths. Under Wavelength Division Multiplexing (WDM), each of the multiple wavelengths transmitted in the strand of fiber can be an independent carrier for a client signal. The client signal thus carried may be any type such as Ethernet frames, IP packets, a fiber channel signal, a SONET or SDH signal, etc.

Because signals transmitting through a fiber experience relatively lower loss than signals transmitting through many other types of media, fiber nowadays is a medium of choice for both long-haul and short-haul transport networks. As a result, optical fibers have been widely deployed. This trend of deployment of optical fibers will most likely continue for a foreseeable future.

Fiber is a very secure medium. First, fibers are typically buried, submerged, or otherwise in places thought to be difficult for intruders to access. Second, to tap into an optical signal, a fiber that carries the signal would typically have to be cut. Such a fiber cut would cause instantaneous interruption to a large number of communication channels, including but not limited to those directly carried by the fiber. A system that monitors any of these large number of communication channels could easily detect and report losses of signal and raise critical alarms. Responding to the alarms, technicians could use tools to isolate the location of the fiber cut, thereby thwarting the malicious attempt to intercept the optical signal carried in the fiber.

However, it is not difficult for a relatively motivated intruder to find access to signal-carrying fibers, especially in light of their wide deployment. Furthermore, prompt and precise isolation of a fiber cut is by no means simple to accomplish. For example, deploying monitoring systems and assigning monitoring in large networks add strains to typically already expensive operating budgets of communications carriers. Therefore, not all fibers may be so closely monitored; a large number of fiber deployments may be left not as secure as one would like them to be.

In addition, it is now technologically feasible for intruders to install clip-on tapping devices on fibers without cutting the fibers. Therefore, no loss of signal might be detected because signal transmission in the fibers would not be interrupted. Even though new, expensive, monitoring systems can theoretically be deployed to detect signal attenuation caused by the tapping devices, still some sophisticated tapping devices may cause too little signal attenuation to be effectively detected, located, and stopped. As a result, even where there is no fiber cut, optical signal transmission may not be as secure as one would imagine it to be.

BRIEF DESCRIPTION OF THE DRAWINGS

The techniques for providing security for fiber-based communications described herein are illustrated by way of example, and not by way of limitation, in the figures of the accompanying drawings and in which like reference numerals refer to similar elements and in which.

DESCRIPTION OF EXAMPLE EMBODIMENTS

Figure 1:
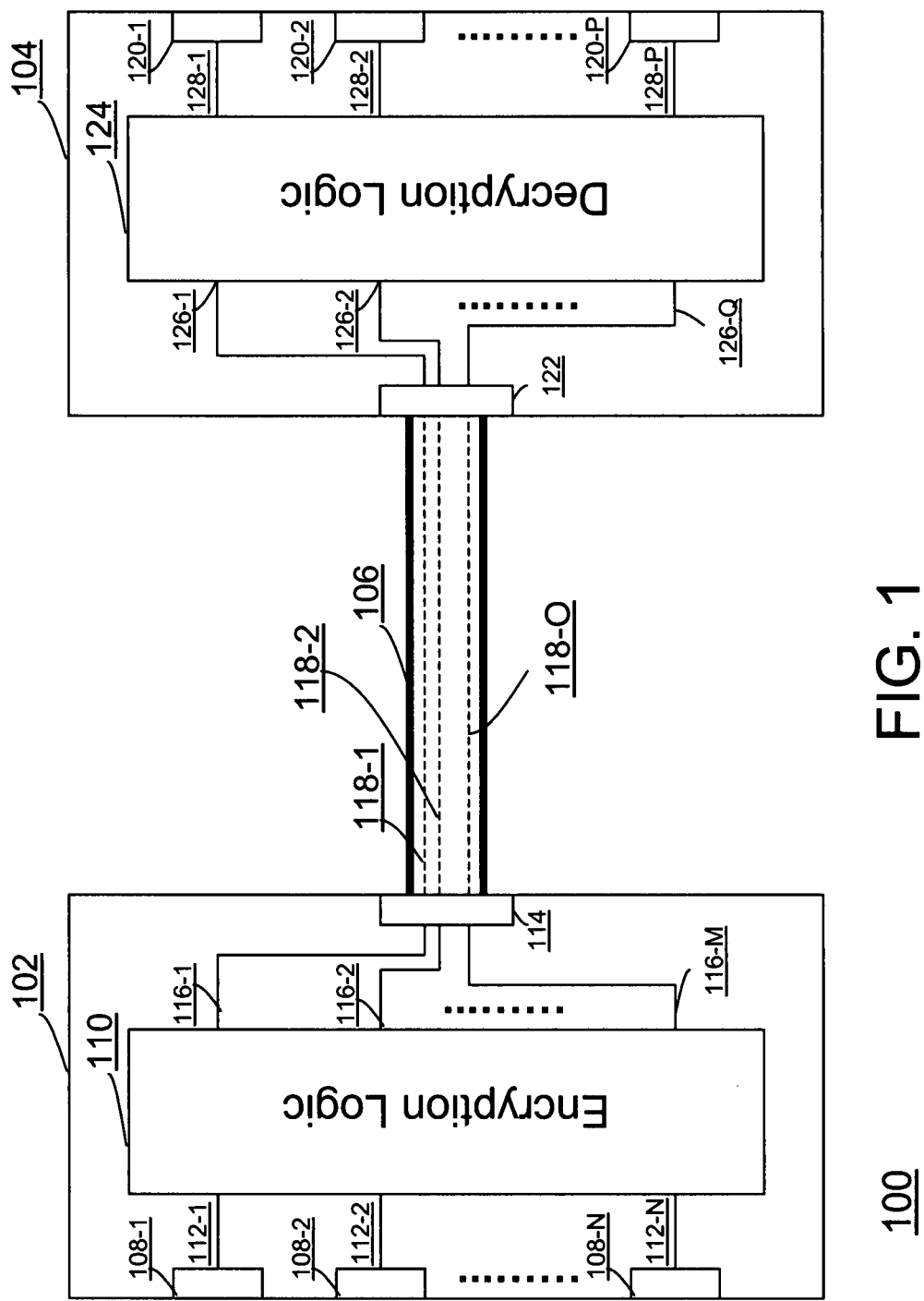
FIG. 1 illustrates an example system operable to provide security for network communications.

Techniques for providing security for fiber-based communications are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Providing Security for Fiber-Based Communications
   3.1 Example Operations
   3.2 Additional Features and Alternative Embodiments
4.0 Implementation Mechanisms-Hardware Overview
5.0 Extensions and Alternatives

1.0 General Overview

The needs identified in the foregoing Background, and other needs and objects that will become apparent for the following description, are achieved in the present invention, which comprises, in one embodiment, an apparatus comprising encryption logic for providing security for fiber-based communications. In accordance with embodiments of the present invention, a data super frame is created by the encryption logic to comprise two or more data frames. In a particular embodiment, the data super frame comprises 256 data frames. Each frame of the data frames in the data super frame contains a payload portion. The encryption logic may receive one or more data payloads that are associated with a client signal. The client signal may be any type of signal including but not limited to electric, sonic, or photonic. In various embodiments, the signal may be, but not limited to, one of (i) a frame relay signal, (ii) an Asynchronous Transfer Mode signal, (iii) an Ethernet signal, (iv) a Fiber Channel signal, (v) a Time Division Multiplexing signal, (vi) an Internet Protocol signal, (vii) a Synchronous Optical Network signal, (viii) a Synchronous Digital Hierarchy signal, or (ix) an Optical Channel signal. Specific embodiments of the present invention also include scenarios where a client signal is a composite signal mixed with (e.g., through multiplexing, virtual containers, encapsulations) several types of the above mentioned signals as its component signals. In one embodiment, the encryption logic receives the client signal and creates the one or more data payloads based on the client signal that was received. In an alternative embodiment, the client signal is received and the one or more data payloads are created by another entity in the apparatus. In this alternative embodiment, the encryption logic receives the one or more data payloads from the other entity in the apparatus.

Using a single set of security control parameters (note, however, that a different data super frames may use a different set of security control parameters, see below), the encryption logic encrypts each payload of the one or more data payloads. In a particular embodiment, a different set of security control parameters may be used for any subsequent data super frame (such as a next data super frame). In one embodiment, where an encrypted payload is derived from encrypting a pre-encrypted payload, the encrypted payload is limited to a size no larger than that of the pre-encrypted payload, by the encryption logic. The encryption logic stores each encrypted payload in a payload portion of a different frame of the data frames in the data super frame. In one embodiment, each payload of the one or more data payloads is encrypted using an Advanced Encryption Standard (AES) based transform. In another embodiment, a Data Encryption Standard based transform may be used for the purpose of encrypting payloads that are associated with the client signal. In some embodiments, encrypting payloads is performed by the encryption logic using a counter-mode, e.g. Galois Counter Mode (GCM), so that a data payload may be divided into different data blocks and that different pre-encrypted data blocks may be encrypted substantially concurrently.

In accordance with specific embodiments of the present invention, the encryption logic may associate each different frame of the data frames with different sets of unused bytes in the (present or current) data super frame.

In a particular embodiment, the (current) set of security control parameters may comprise a security parameters index (SPI), a sequence number, an initialization vector (IV), and an integrity check value (ICV). In other embodiments, the set of security control parameters may comprise different parameters corresponding to a particular encryption method that the encrypting logic uses to encrypt the data payloads.

In any of these embodiments, instead of storing the set of security control parameters in a single data frame, the encryption logic stores the set in different sets of unused bytes associated with at least two different frames of the data frames. As used herein, the term "storing the set of security control parameters" may also refer to storing sufficient information in data frames for a receiver of the data frames (along with the stored information) to read such information and further, based on such information, to deduce or derive the rest of the set of security control parameters. The term "sufficient information" may or may not include all the security control parameters used by the encryption logic, so long as such information provides a sufficient basis for deducing or deriving a current set of security control parameters by the receiving side to enable itself to decrypt the data payloads in the present data super frame. Under this approach, the set of security control parameters are split over two or more frames (or their respectively associated bytes previously unused), instead of storing the entire set of security control parameters either in a single data frame or in each data frame. Since only a few previously unused bytes, associated with the data frames, are used to store encryption control information, the signal to be transported over the medium does not have to carry additional overhead bytes. As a result, signals can be transported at their native wire speeds, subject only to ordinary synchronization adjustments between the transmitting apparatus and the receiving apparatus. As a further result, there is no need to use a pause mechanism to slow down upstream signal transmission rates for the purpose of inserting additional bytes carrying encryption information towards downstream. Also, there is no need to use a higher transmission rate between the transmitting apparatus and the receiving apparatus in order to carry a signal at a lower transmission rate plus additional encryption information.

Indeed, candidate sets of security control parameters any of which sets can be used by the encryption logic in its encryption operation may already be separately configured, exchanged, negotiated and/or pre-negotiated in part or in whole. Such configuration, exchange or negotiation may occur in-band and/or out-of-band (i.e., outside the communication channel that carries the data frames). Thus, the phrase "storing the set of security control parameters in the sets of unused bytes associated with the data frames" may refer to storing sufficient information to point to a current set among the candidate sets of security control parameters as being used to encrypt the present data frames. It should be understood that specific values of some security control parameters in the current set may already be made known to communication principals involved here in their prior separate configuration and/or negotiation. Since the specific values of some security control parameters are already known to the communication principals, the encryption logic may only need to pass the previously mentioned "sufficient information" to point to these specific values.

For example, in some embodiments where an AES based encryption method is used, one or more secret keys that may be used by the encryption method may already be established by a transmitting apparatus and a receiving apparatus in their prior data communications out-of-band before the data frames in the present data super frame are sent. Specific embodiments of the present invention may include establishing four or more such secret keys. To establish the keys, transport protocol like SONET/SDH and OTN that have generic/data communication channels may be used by the apparatuses. In one embodiment, while values of some other security control parameters in the current set are sent with the data frames in the current data super frame, the secret key associated with the current set is not sent with the data frames. Rather, the receiving side will use one or more of the other security control parameters, for example, SPI, as an index to point to which of the established secret keys should be used for the present data super frame.

In other embodiments, the invention encompasses a method that may be implemented by a networking apparatus for providing security for fiber-based communications.

In some embodiments, the techniques for providing security for fiber-based communications described herein may be implemented using one or more computer programs executing on a network infrastructure element, such as a switch, a router, a multiplexer, or an add-drop multiplexer, that is established in a network. In some embodiments, the techniques described herein may be implemented by an appliance computer system that is operatively and/or communicatively coupled to a network infrastructure element, such as a switch, a router, a multiplexer, or an add-drop multiplexer. In some embodiments, the techniques described herein may be implemented on a host computer system that is communicatively connected to a network. Thus, the embodiments described herein are to be regarded in an illustrative rather than a restrictive sense.

2.0 Structural and Functional Overview

In accordance with one embodiment of the present invention, the methodology disclosed herein may be implemented by a networking apparatus, as previously alluded to. For purposes of the present invention, the networking apparatus may be any type of networking apparatus such as a transmitting apparatus, or an apparatus that functions as both a transmitting apparatus and a receiving apparatus. Examples of networking apparatuses may include but are not limited to a switch, a router, a multiplexer, or an add-drop multiplexer that transmits signal through a communication medium. For purposes of the present invention, the functionality of the networking apparatus may be implemented in various ways. For example, the functionality of the networking apparatus relating to some embodiments of the present invention may be implemented as a set of instructions executed by a processor, a network processor, a switch fabric, etc. Alternatively or additionally, such functionality may be implemented as hardwired logic components, such as that embodied in an ASIC or an FPGA. Examples of communication media used by the networking apparatus implementing embodiments of the present invention may include but are not limited to an optical fiber. Other specific embodiments of the present invention may involve use of another medium such as copper, free air optical transmission, etc. To illustrate how such networking apparatus may operate with such a communication medium in accordance with one embodiment of the present invention, reference will be made to an example system 100 shown in FIG. 1, and example diagrams shown in FIGS. 2, 3 and 4.

As shown in FIG. 1, the system 100 comprises a transmitting apparatus 102 and a receiving apparatus 104 and an optical fiber 106 that both apparatuses are operatively connected to. The transmitting apparatus 102 comprises one or more client signal input ports 108 (1, 2, . . . N as illustrated) through which one or more client signals may be received thereby, encryption logic 110, one or more payload input link 112 (1, 2, . . . N) that connects between the client signal input ports 108 and the encryption logic 110, an optical transmitting port 114, and one or more multiplexing links 116 (1, 2, . . . M) that connects between the encryption logic 110 and the optical transmitting port 114.

Figure 2:
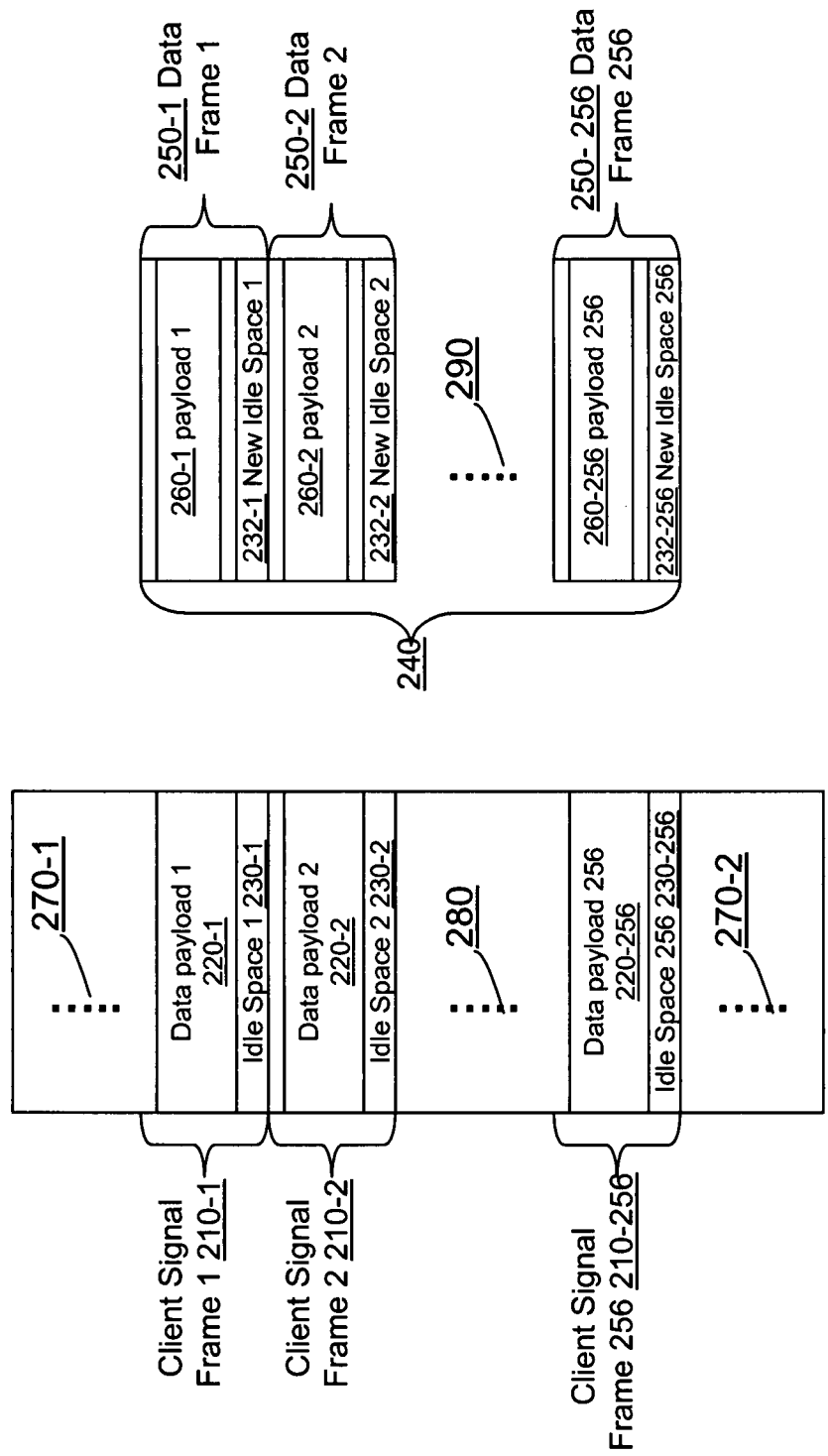
FIG. 2 illustrates an example data super frame.

Each of the received client signals through the ports 108 may be divided into a number of client signal frames (210 of FIG. 2). For example, a client signal may be received and processed at a port 108-1 by a client signal receiving logic of the transmitting apparatus 102. This client signal receiving logic may create a series of client signal frames 210 based on the signal that was received. This series of client signal frames 210 may be sent to the encryption logic 110 via a payload input link 112-1. A frame 210 in the series of client signal frames comprises a data payload (220 of FIG. 2). In some embodiments, such a client signal frame 210 may contain other fields such as a frame header, and/or a Cyclic Redundancy Check (CRC) field whose value may be computed in part or in whole based on the data payload 220 carried in the frame 210. In one embodiment, such a data payload 220 may even contain one or more padding bytes, for example, for the purpose of aligning the data payload with a specific byte boundary.

In one embodiment, an idle space 230 separates any two successive client signal frames 210 from each other (as illustrated in FIG. 2). Such an idle space 230 may comprise multiple idle words each of which may contain several (for example, in one embodiment, four) bytes.

The encryption logic 110 as illustrated in FIG. 1 creates a data super frame (240 of FIG. 2) that comprises one or more data frames (250 of FIG. 2). Each of the data frames 250 is to be a separate unit of data transmission (transmitted either synchronously or asynchronously) over the optical fiber 106. Such a data frame 250 comprises a payload portion 260 to store an encrypted payload that is obtained from encrypting a data payload 230 in a client signal frame 210. Such a data frame 250 may comprise other portions to store any other fields carried in the client signal frame 210 apart from the data payload 230. In a particular embodiment, while data payloads 220 in client signal frames 210 are encrypted and stored in data frames 250, other fields in client signal frames 210 may be stored in corresponding fields of the data frames 250 in plaintext, without encryption by the encryption logic 110. In a particular embodiment, the number of data frames 250 in such a data super frame 240 is 256 (as illustrated in FIG. 2).

To encrypt the data payloads 230 received, the encryption logic 110 selects one of one or more security associations which have been configured, negotiated or otherwise established by the networking apparatuses 102 and 104. The selected association may specify a scheme that includes an algorithm for the purpose of encrypting data payloads 220 and points to a specific format as to how security control parameters should be embedded in the data super frame 240. Such embedded security control parameters would be used by the receiving apparatus 104 in decrypting the encrypted payloads in the data frames 250 contained in the data super frame 240.

In some embodiments, the negotiated association mentioned above also includes a secret key that the transmitting apparatus should use to encrypt the data frames 250. In some specific embodiments of the present invention, instead of using the secret key directly, a round key is derived, based on the secret key, and used by the encryption logic to encrypt the payloads that are stored into the data frames, for example. Such a round key may be used, for example, in conjunction with an AES key expansion scheme.

In one embodiment, the one or more security associations may be communicated, negotiated and established using an out-of-band data communication channel between the networking apparatuses 102 and 104. In an alternative embodiment, an in-band data communication channel may be used to establish the one or more security associations between the apparatuses 102 and 104. In some other embodiments, the one or more security associations may even comprise a no-op (i.e., no security protection) security association.

The one or more security associations may initially comprise default (or factory-configured) security associations that do not require the previously discussed configuring or negotiating step. At the time of being placed into service or during service, the networking apparatuses may establish, through configuration, exchanging, negotiation, etc, some or all security associations that differ from the factory configured defaults.

In one embodiment, even for an established security association, one or more parameters in the security associations may be updated from time to time while in service. For example, a secret key that is associated with any of the security associations that are currently unused may be updated. In one specific embodiment, such updating may occur out-of-band in any of the available generic/data communication channels that may be designated for the purpose of operations, administration and management. In some embodiments, the secret key is symmetric, the same value of which is shared between the transmitting and receiving apparatuses.

Based on the selected security association, the encryption logic 110 determines a set of security control parameters to be used for encryption. In some embodiments, the encryption logic 110 may randomly select an initialization vector as a part of the set of security control parameters, to be used with the encryption algorithm. In addition, the encryption logic 110 may also compute an ICV value as a part of the set of security control parameters. This ICV computation may be based on the contents of the payloads that are encrypted and stored in the data frames in the present data super frame.

In some embodiments, receiving data payloads 220, creating data super frames 240 and determining sets of security control parameters may be done in parallel or in a pipeline manner with respect to one another, where possible.

The encryption logic 110 selects one or more data payloads 220 (or client signal frames 210) associated with the client signal for the purpose of storing them in the data super frame 240 created. In one embodiment, the one or more data payloads 220 to be stored in the data super frame 240 are contained in successive client signal frames associated with the client signal. In an alternative embodiment where the client signal is multiplexed from one or more tributary client signals, the one or more data payloads 220 may be concurrently derived from one or more client signal frames of the tributary client signals.

Ellipses 270 in FIG. 2 indicate other client signal frames may be preceding or following the client signal frames in the series of client signal frames that the encryption logic 110 of FIG. 1 is to process, in accordance with an embodiment of the present invention. Ellipsis 280 indicates more client signal frames between a client signal frame 2 and a client signal frame 256 in the same series. Ellipsis 290 indicates more data frames between a data frame 2 and a data frame 256 in the data super frame 240.

While client signal frames 210, data payloads 220, and idle spaces 230, as illustrated in FIG. 2, have been labeled therein in sequence (1, 2, . . . 256), there is in fact no explicit information embedded in these client signal frames (or the client signal) that indicate they should be labeled in any particular manner. For the purpose of illustration, the encryption logic 110 may arbitrarily select a position in the series of client signal frames as a starting point for a collection of successive client signal frames that are to be encrypted and stored in the data frames 250 of the data super frame 240. Thus, while a data super frame such as 240 has a defined boundary, the client signal frames is a boundary-less stream, any sequence labeling of which is to some extent artificial and arbitrary.

Furthermore, in other embodiments, the number of data frames 250 in the data super frame 240 may be more or fewer than 256. As a result, all variations of numbers of data frames in a data super frame are within the scope of the present invention.

For each data payload 220 (or a client signal frame 210) selected, the encryption logic 110 creates a corresponding encrypted payload using the encryption algorithm associated with the selected security association and the set of security control parameters. In one embodiment, the each encrypted payload (i.e., the resultant ciphertext) requires no more memory space to store than its original pre-encrypted data payload (i.e., the original plaintext). Each such encrypted payload is then stored by the encryption logic 110 to a payload portion (260 of FIG. 2, say 260-1) in a data frame 250 in the data super frame 240. In one embodiment, the data frames 250 are explicitly sequenced in order (by a counter field associated with the data frame 250, as will be further explained), and the encrypted payloads are stored in sequence in accordance to the order of receipt in which the original data payloads 220 (or client signal frames 210) are received by the encryption logic.

In one embodiment, the client signal is a Fiber Channel signal and a client signal frame 210 is a Fiber Channel frame (which, for example, is encoded using an 8B/10B scheme). Each Fiber Channel frame received at a fiber channel port such as the client signal port 108-1 comprises a frame header, a data payload 220 (which may contain a network header and other data contents), and a CRC field. Such a frame header and such a CRC field are considered as other fields in such a client signal frame. As previously noted, such other fields may be transmitted in plaintext over the optical fiber 106 while an associated data payload 220 is encrypted and transmitted over the same link.

The encryption logic 110 of FIG. 1 may create a new idle space (232 of FIG. 2) between two successive data frames 250 in the data super frame 240. In some embodiments, the size of the new idle space 232 is set to be the same as an idle space 230 between two client signal frames 210 whose data payloads 220 are to be stored in the two successive data frames 250 that the new idle space 232 separates. In some embodiments, the size of the new idle space 232 may be different from such an idle space 230. For example, new idle spaces in the data super frame 240 may be more or less adjusted or set to various, different sizes for the purpose of synchronizing transmitting and receiving between the networking apparatuses 102 and 104.

A new idle space 232 comprises one or more idle words. In some embodiments, a new idle space 232 comprises at least six (6) idle words, and each of the one or more idle words in turn may comprise four unused bytes. The encryption logic 110 may associate each data frame 250 with an idle word that follows the each frame. In one particular embodiment, the encryption logic 110 associates a frame 250 with the firs idle word that follows.

In some embodiments, instead of associating frames 250 with idle words there between, the encryption logic may associate each data frame 250 with unused bytes within the each data frame. In some embodiments, a data frame 250 comprises a digital wrapper. The digital wrapper carries overhead bytes that are used to convey control or status information between communication principals along a section, a link, or a path of communication links such as the optical fiber 106. In one embodiment, some bytes in a digital wrapper of any such data frame in the data super frame are unused (for example, reserved for future use). Additionally or alternatively, even if some bytes in the digital wrapper could be presently used in a particular implementation, these bytes may not be used in other implementations and can still be considered as unused bytes in these other implementations. The encryption logic 110 may associate a data frame with some unused byte in a digital wrapper thereof. As a result, each different frame of the data frames is associated with different designated bytes within the digital wrapper of the each different frame. In one embodiment, each frame of the data frames in the data super frame is formatted based on a G.709 standard. Each such frame has a digital wrapper in accordance with the G.709 standard. Reserved bytes in such a digital wrapper or unused bytes in some implementations of the G.709 standard may be deemed as unused bytes, some of which can be made to be associated with a containing data frame.

For the purpose of illustration, suppose that four unused bytes in a new idle space 232 are now associated with an immediately preceding data frame 250, and that a data super frame such as 240 contains 256 data frames 250, as illustrated in FIG. 2. Each such four bytes (310 of FIG. 3) would then comprise byte 0 through 3, as shown in FIG. 3.

In one embodiment, byte 0 is a command byte (320 of FIG. 3), each bit of which may be used to carry command information. For example, bit 0 of the command byte 320 may be used to indicate if encryption is on or not; bit 1 may be reserved for future use; bit 2 may be used to indicate if a default key should be used (for example, a default secret key may be factory-configured and used where no shared key has not been established between the networking apparatuses 102 and 104 through configuration, exchange or negotiation); bit 3 may be used to indicate whether byte 2 carries meaningful information (for example, indicating whether the data payloads in the data super frame is encrypted or not); bit 4 may be used to signal whether the transmitting apparatus 102 is ready to decrypt payloads from a reverse direction where the transmitting apparatus 102 is concurrently a receiving apparatus in the reverse direction and the receiving apparatus 104 is concurrently a transmitting apparatus in the reverse direction; bits 5 and 6 may be used as an SPI to indicate which security association is to be used as the current security association for encryption and decryption among a set of up-to-four security associations that have been established between the transmitting and receiving apparatuses; and bit 7 may be used to indicate a Remote Fail condition (for example, the security control information received in the reverse direction is corrupted) experienced in the reverse direction by the networking apparatus 102.

In one embodiment, byte 1 may be a counter byte (330 of FIG. 3), whose value indicates a sequence position of a data frame 250 among all the data frames in the current data super frame. Since there is four bytes associated with each data frame 250, there is a counter byte 330 associated with the each data frame 250. In one embodiment, the first data frame 250-1 in the data super frame 240 is set to a value of 0 in the counter byte 330, the second data frame 250-2 a value of 1 in the counter byte 330, and so on.

Figure 3:
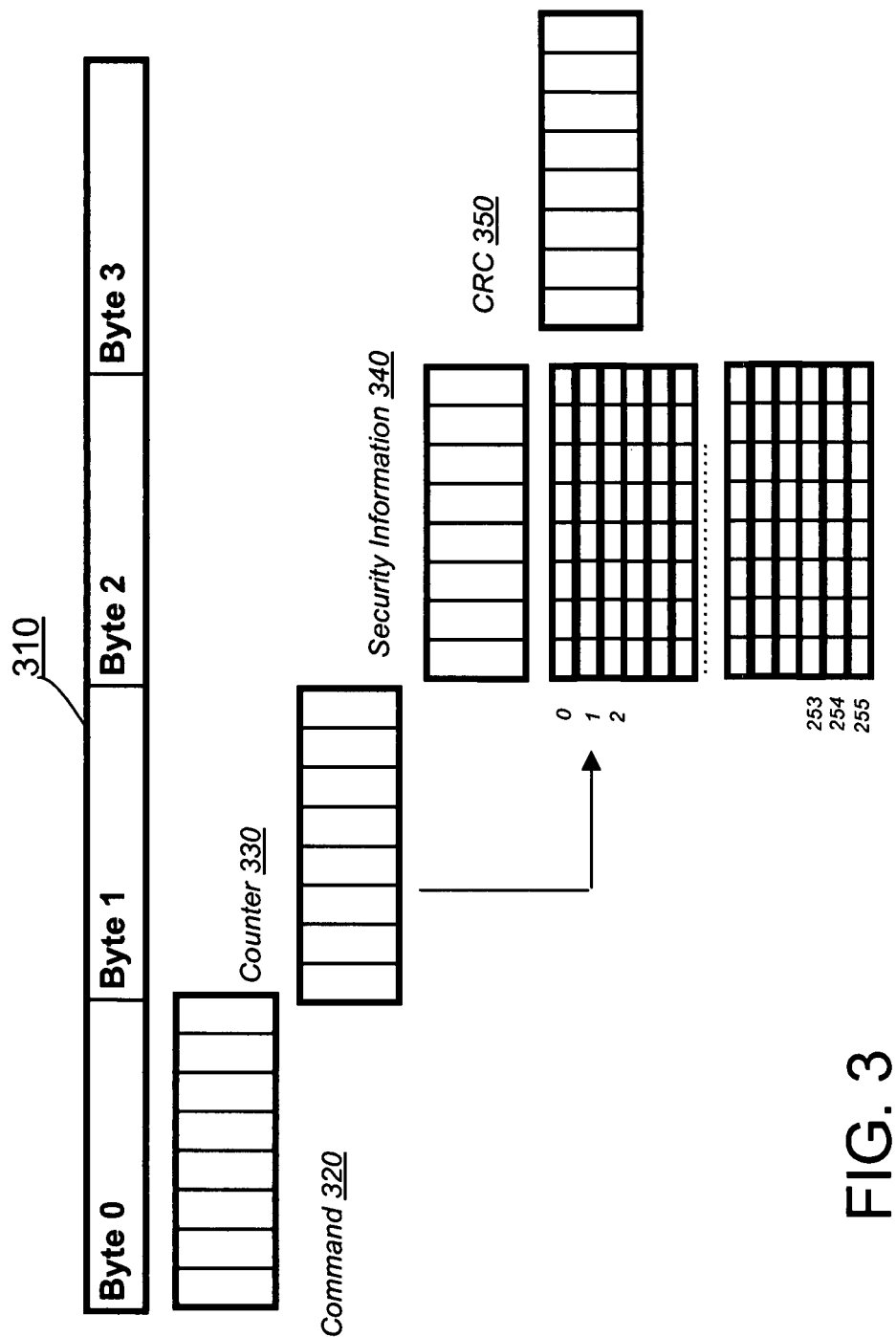
FIG. 3 illustrates example bytes that are associated with a data frame in a data super frame.
Figure 4:
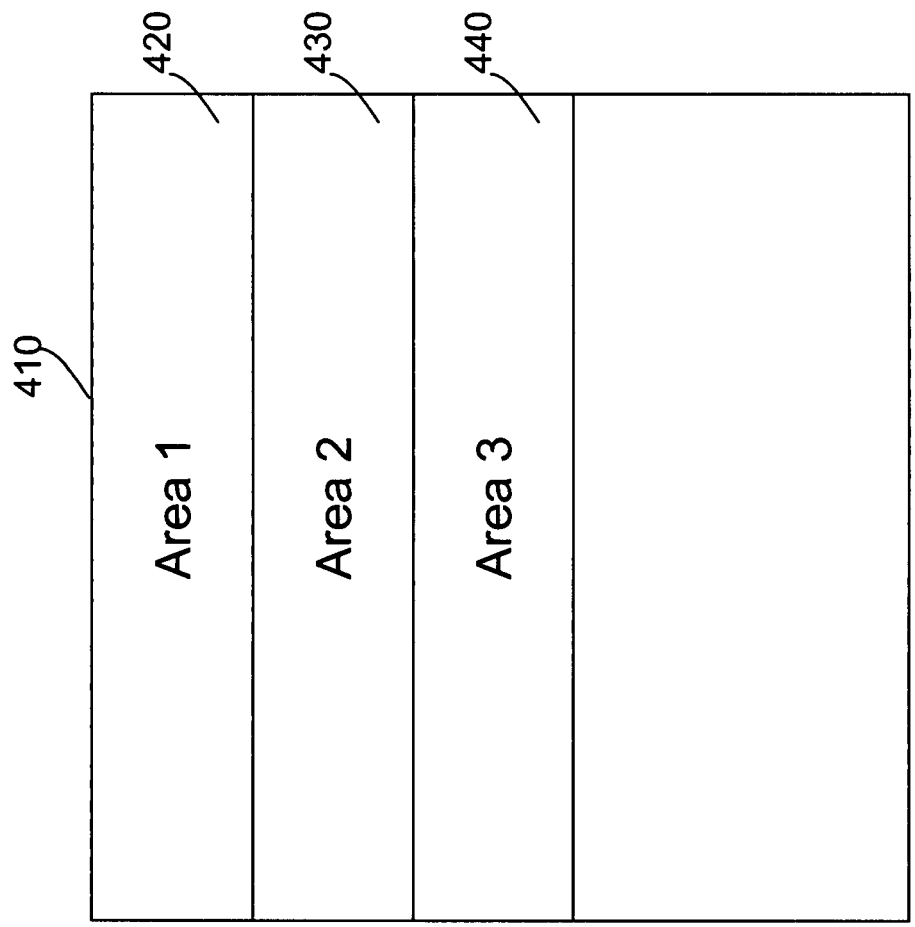
FIG. 4 illustrates example security information bytes that are associated with data frames in a data super frame.

Byte 2 may be used as a security information byte (340 of FIG. 3). Security information bytes 340 from all the data frames 250 in the data super frame 240 can be considered as, or mapped to, a single memory space (410 of FIG. 4) that comprises 256 bytes (note that 256 is a number for illustration only; for the purpose of present invention, more or less than 256 data frames may be grouped in a data super frame). In one embodiment, within such single memory space, security information bytes are ordered by sequence values stored in their respective counter bytes. The use of this single memory space will be further explained later.

To protect the integrity of the other three bytes, described above, byte 3 (350 of FIG. 3) may be used as a CRC field to store a CRC value. Such a CRC value can be calculated based on values stored in the preceding three bytes. Note that this CRC field is different from any CRC field that may be carried in a client signal frame 210.

As previously noted, the set of security control parameters may comprise a security parameters index (SPI) that maps to the security association selected by the encryption logic 110 to secure the data payload information stored in the data super frame 240, a sequence number that is unique for the data super frame 240 and is used to prevent replay types of cryptographic attacks (which is a different parameter from counter bytes associated with data frames 250), an initialization vector (IV) that may be used, for a plaintext, to produce a ciphertext that is different from another ciphertext that would be produced for the same plaintext but with a different IV, and an integrity check value (ICV) that is similar to a CRC value but may be calculated based on both the content of all the encrypted payloads carried in all the data frames 250 in the data super frame 240 and the cryptographic information associated with the selected security association.

Instead of storing the entire set of security control parameters with any particular data frame 250, the encryption logic stores the set in different unused bytes associated with at least two different frames 250.

As previously described, in one embodiment, the SPI in the set of security control parameters may be stored in byte 0, or the command byte (for example, bits 5 &6). In some embodiments, the rest of the set of security control parameters is stored in the memory space 410 of FIG. 4. In an example embodiment, the memory space 410 may be divided into several areas such as area 1 (420), area 2 (430), area 3 (440), etc. The IV may be stored in the area 1 420. In some embodiments, area 1 410 also stores additional information beyond the current set of security control parameters. For example, area 1 410 may additionally store next IV, next+1 IV, and a Trail Trace Identifier (TTI) that is used to verify that the transmitting and receiving apparatuses remain connected as configured. In one embodiment, each of these four fields— i.e., current IV, next IV, next+1 IV, and TTI—takes up 16 bytes. A (current key) index to the secret key associated with the current security association may be stored in area 2 430. As previously discussed, the key may not be directly transmitted in the memory space 410, but is established through configuration or negotiation using in-band or out-of-band data communication channels that may implement various secure key exchange protocols. Furthermore, the encryption logic may use a derivative key such as a round key computed based on the secret key, instead of using the secret key directly, in encrypting a specific payload for a data frame in the present data super frame.

In one particular embodiment, an updated key index may also be stored in area 2 430. For example, when the transmitting apparatus updates a secret key associated with any of the security associations, the transmitting apparatus may store an updated key index in area 2 430 to indicate to the receiving apparatus that a secret key is updated at the transmitting apparatus and, in addition, which security association's secret key is updated. Specific embodiments of the present invention may involve exchanging the secret key that is being updated between the apparatuses in an out-of-band generic/data communication channel, in tandem with the indication of the updated key index in area 2 430. Alternatively, other specific embodiments of the present invention may involve exchanging the secret key in an in-band generic/data communication channel, along with the indication of the updated key index in area 2 430.

In some embodiments, Area 2 430 may store parameters that can be used to compute the previously mentioned round key from the secret key, for example, where an AES key expansion scheme is used by the transmitting and receiving apparatuses.

Area 3 440 may optionally store communication bytes. These communication bytes may be used in a manner or role similar to SDH DCCR bytes (D1-D3) or DCCM bytes (D4-D12). As a result, the previously unused bytes that are respectively associated with their data frames not only carry encryption control information but also convey encryption status information as well as maintenance and status information relating to the near end and the far end of the communication link.

Optionally, additional areas may be defined (not shown) in the memory space 410. For example, an additional area may optionally be defined and used to convey other control or status information which may include, but not limited to, remote encryption failure, errored CRC on the Far End, etc.

After the encrypted payloads are stored into the data frames 250 (i.e., in ciphertext) and after the set of security control parameters, commands 320, counters 330 and CRCs 350 are stored into the previously unused bytes, and after any other fields in the client signal frames are stored in the data frames 250 (for example, in plaintext), the encryption logic 110 sends the container data super frame 240 to the optical port 114 through one of the multiplexing links 116, say 116-1. In some embodiments, because the encryption logic 110 may receive tributary client signals through the client signal ports 108 and subsequently multiplex multiple tributary client signals into a single stream of successive data super frames 240 to the optical port 114, the number of the multiplexing links 116 may not be the same as the number of the client signal ports 108.

In a particular embodiment, each stream of successive data super frame 240 through a multiplexing link 116 may be associated with one of optical channels 118. In the present example, the data super frames 240 from the multiplexing link 116-1 may be associated with an optical channel 118-1. In an alternative embodiment, a stream multiplexing logic implemented in conjunction with the port 114 in the networking apparatus 102 may associate several streams of data super frames 240 from several multiplexing links 116 with a single optical channel 118.

Transmission logic implemented with the optical port 114 transmits each data frame 250 as a separate unit of transmission to the receiving apparatus 104. The transmission logic also guarantees that any previously unused bytes that are associated with each such data frame 250 are transmitted unperturbed to the receiving apparatus 104. In the Fiber Channel case, for example, the idle word immediately following each data frame (which stores the set of security control parameters among other things) is guaranteed to be transmitted with a content that has been set by the encryption logic 110 unperturbed, even if a variable number of other idle words that are not associated with the data frame may also be inserted or set (for purposes of synchronization, for example) by the transmission logic. In the G.709 case, for example, the overhead bytes in the digital wrapper that stores the set of security control parameters is also guaranteed to be transmitted unaltered, whether other bytes in the wrapper may or may not be changed by the transmission logic.

After the data frames 250 and their associated bytes are sent over through the optical fiber 106 to the receiving apparatus 104, a corresponding process is employed to decode and decrypt the information carried within.

In accordance with one embodiment of the present invention, the receiving apparatus 104 comprises one or more output ports 120 (1, 2 ... P as illustrated), through which one or more client signals that are transported through the optical fiber 106 may be sent. Various other entities of the receiving apparatus 104 contained therein are illustrated in FIG. 1. Each of the output client signals may be assembled from a series of payloads recovered from data frames and their associated bytes transmitted from the transmitting apparatus 102. For example, part of an output client signal may be recovered from the data frames and their unused bytes in the data super frame that, as previously discussed, are carried in the optical channel 118-1.

Receiving logic at an optical receiving port 122 may detect a data frame boundary (e.g., by sensing a sufficiently long sequence of a specific bit pattern) using a method known in the art. In an example embodiment where idles are used to delimit between two successive data frames, the receiving logic may recognize the end of such a delimiter and expect a data frame to follow.

In a similar manner, the receiving logic may also detect the beginning of next delimiting idles that follow the end of a data frame (or rather, follow the bytes that are associated with the data frame). The number of bytes that are associated with a data frame in some embodiments is set to be four. The receiving logic can thus decode an optical channel signal received from 118-1 into a series of data frames and bytes respectively associated therewith.

Additionally or alternatively, in some embodiments where data frames are of a constant size, the receiving logic may detect the end of a data frame simply by counting the number of bytes from the beginning of a data frame.

In one embodiment, data frames and their associated bytes are sent to decryption logic 124 via one of de-multiplexing links 126. For the purpose of illustration, the data frames in the data super frame, as previously discussed, are recovered by the receiving logic and subsequently sent thereby to the decryption logic 124 via a link 126-1. In some embodiments, the counters in the associated bytes (with the data frames) store sequence numbers associated with the data frames. Each of the data frames is associated with a sequence number that is unique among all the data frames within the data super frame. In one example embodiment, sequence numbers are 0 through 255, where the number of the data frames in the data super frame is set to be 256. The first data frame has a sequence number of 0; the second data frame has a sequence number of 1, and so on. Thus, the decryption logic 124 may assemble all the bytes associated with all the data frames that belong to a single data super frame (i.e., the data super frame as previously discussed). From the assembled bytes, the decryption logic 124 may retrieve the set of security control parameters that are used for encryption by the transmitting apparatus 102. In one embodiment, the set of security control parameters contains IVs and a sequence identifier that are used to thwart cryptographic attacks including repeat attacks.

In some embodiment, based on the set of security control parameters, the decryption logic 124 may determine the security association selected by the transmitting apparatus 102. Furthermore, based on the selected security association, the decryption logic 124 determines the particular security scheme that was employed by the transmitting apparatus 102 in handling the data frames in the data super frame. As a result, the decryption logic 104 may decrypt the encrypted payloads in the data frames and subsequently recover the data payloads that were received by the transmitting apparatus 102. Based on the data payloads recovered, the decryption logic 104 determines a corresponding client signal transmitting port 120, say 120-1, to forward the data payloads. After the data payloads are received via a data payload transmitting link 128-1 by client signal transmitting logic implemented on the client signal transmitting port 120-1, the client signal is recovered from the data payloads and transmitted out of the port 120-1.

As this discussion shows, in accordance with an embodiment of the present invention, data payloads are encrypted using an encryption algorithm in conjunction with a set of security control parameters. The size of each encrypted data payload does not require a larger payload portion to carry than an unencrypted data payload that gives rise to the encrypted payload. Moreover, the security control parameters are divided and stored in the formerly unused bytes that are associated with data frames transmitted through an optical fiber such as 106 of FIG. 1. Since data frames with encrypted payloads are of the same size as those with corresponding unencrypted data payloads, the client signal may be securely transmitted through the optical link at a wire speed.

3.0 Providing Security for Fiber-Based Communications 3.1 Example Operations

To illustrate how security for fiber-based communications can be provided by the encryption logic 110 in accordance with one embodiment of the present invention, reference will now be made to an example. In the following discussion, reference will be made to the system diagram of FIG. 1, and to a flow diagram of FIG. 5.

Figure 5:
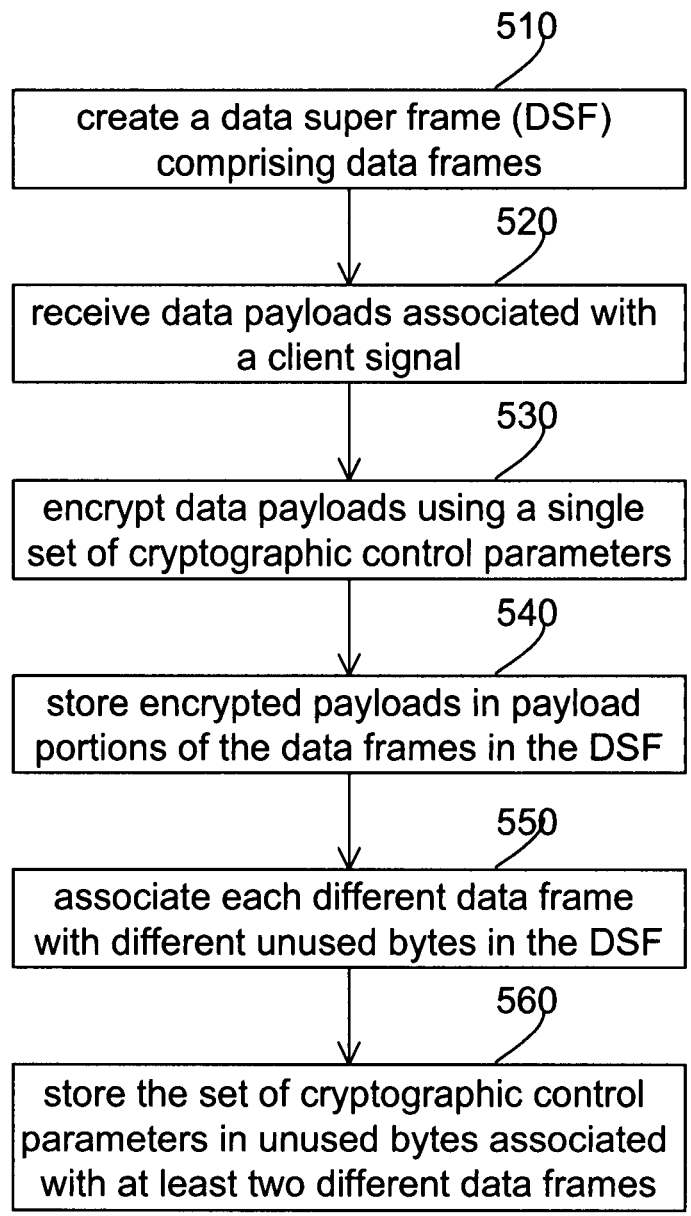
FIG. 5 illustrates an example process flow.

Initially, a data super frame that comprises two or more data frames is created (step 510 of FIG. 5). Each of the data frames in the data super frame contains a payload portion.

Each payload portion of such a data frame enables the encryption logic to store an encrypted payload that is derived from encrypting a data payload that is associated with a client signal.

Next, the encryption logic receives one or more data payloads that are associated with the client signal (step 520 of FIG. 5). The client signal may be of any type such as (i) a frame relay signal, (ii) an Asynchronous Transfer Mode signal, (iii) an Ethernet signal, (iv) a Fiber Channel signal, (v) a Time Division Multiplexing signal, (vi) an Internet Protocol signal, (vii) a Synchronous Optical Network signal, (viii) a Synchronous Digital Hierarchy signal, or (ix) an Optical Channel signal.

For each such received data payload associated with the client signal, the encryption logic encrypts it into an encrypted payload using a single set of security control parameters (step 530 of FIG. 5). This set of cryptographic control will be used to encrypt at least for all payloads that are to be stored in the data super frame (or rather, to be stored in the data frames therein).

After the data payloads are encrypted into encrypted payloads, the encryption logic stores each encrypted payload in a payload portion of a different frame of the data frames in the data super frame (step 540 of FIG. 5). In one embodiment, the encrypted payloads are stored in the same order in the data frames as their original data payloads were received.

To store the set of security control parameters that is used to encrypt the data payloads, the encryption logic first associate each different frame of the data frames with different sets of unused bytes in the data super frame (step 550 of FIG. 5). For example, such unused bytes may be found between any two successive data frames in the data super frame. In one embodiment, four bytes in an idle space between such data frames are associated with the data frame time-wise before the idle space.

After locating the set of unused bytes that are associated with the data frames in the data super frame and associating those bytes with their respective data frames, the encryption logic proceeds to store the set of security control parameters in different sets of unused bytes associated with at least two different frames of the data frames (step 560 of FIG. 5).

While the above description of an encryption process 500 is described in a sequential manner, in various embodiments, the steps as described may be run in a pipeline fashion or in parallel with each other wherever feasible. For example, when the encryption logic has finished storing an encrypted payload and possibly other information (plaintext, CRC, etc.) in a data frame of the data super frame, such a data frame may be transmitted as an independent unit of transmission. Similarly, bytes, associated with the data frame, that store part of the set of security control parameters may be transmitted once they are properly set. This transmission may occur before other data frames or other bytes associated with other data frames are transmitted or properly set.

3.3 Additional Features and Alternative Embodiments

Some embodiments may implement the techniques for providing security for fiber-based communications described herein over another medium such as, for example, free air optical transmission.

Thus far, the transmitting apparatus 102 and the receiving apparatus 104 have been described as connected through an optical link provided by the optical fiber 106. It should be noted that this is for illustrative purposes only. For purposes of the present invention, the optical link may also be made up of multiple optical fibers. In addition, each optical link between the apparatuses may comprise intermediate sections or links that may or may not be optical, and may also comprise intermediate networking apparatuses of varying types. Furthermore, as previously noted, other types of communication links between the apparatuses 102 and 104 may be used in place of optical link, in accordance with some embodiments of the present invention. Thus, all possible alternatives of establishing a communication link are within the scope of the present invention.

Various other features may be included, and various other modifications may be made, to the embodiments of the techniques for providing security for fiber-based communications described herein. Thus, the embodiments described herein are to be regarded in an illustrative rather than a restrictive sense.

4.0 Implementation Mechanisms—Hardware Overview

Figure 6:
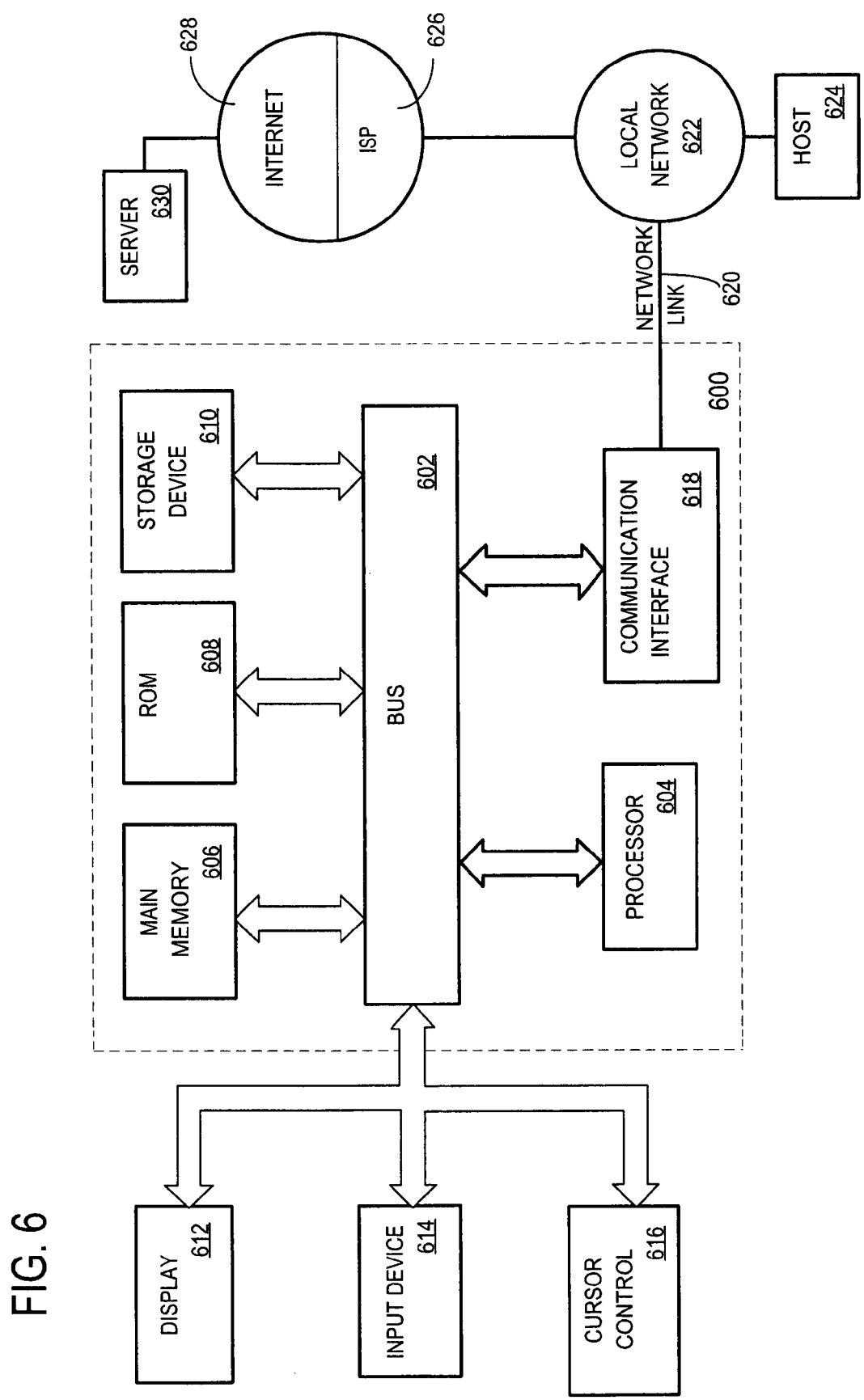
FIG. 6 illustrates a computer system.

FIG. 6 illustrates a computer system 600 upon which embodiments of the techniques for providing security for fiber-based communications may be implemented. A preferred embodiment is implemented using one or more computer programs running on computer system 600, which is operatively coupled to the backplane of a network infrastructure element such as, for example, a router or a switch.

Computer system 600 includes a bus 602 or other communication mechanism for communicating information, and a processor 604 coupled with bus 602 for processing information. Computer system 600 also includes a main memory 606, such as a random access memory ("RAM") or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory ("ROM") 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube ("CRT"), for displaying information to a computer user. An input device 614, including alphanumeric and other keys, is coupled to bus 602 for communicating information and command selections to processor 604. Another type of user input device is cursor control 616, such as a mouse, trackball, stylus, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

In one embodiment, computer system 600 is used for providing security for fiber-based communications. According to this embodiment, security of fiber-based communications is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry or other hardware-based logic may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network ("ISDN") card or a modem to provide a data communication connection to a corresponding type of telephone line. As another example, communication interface 618 may be a local area network ("LAN") card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider ("ISP") 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for security for fiber-based communications as described herein.

The received code may be executed by processor 604 as it is received, and/or stored in storage device 610, or other non-volatile storage for later execution. In this manner, computer system 600 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising:
creating a data super frame that comprises two or more data frames, wherein each frame of the data frames contains a payload portion;
receiving one or more data payloads that are associated with a client signal;
encrypting each payload of the one or more data payloads using a single set of security control parameters;
storing each encrypted payload in a payload portion of a different frame of the data frames in the data super frame;
associating each different frame of the data frames with a different set of unused bytes in the data super frame; and
storing different members of the set of security control parameters in different sets of unused bytes associated with at least two different frames of the data frames,
wherein the method is performed by one or more computing devices.

2. A method as claimed in claim 1, wherein the client signal is one of (i) a frame relay signal, (ii) an Asynchronous Transfer Mode signal, (iii) an Ethernet signal, (iv) a Fiber Channel signal, (v) a Time Division Multiplexing signal, (vi) an Internet Protocol signal, (vii) a Synchronous Optical Network signal, (viii) a Synchronous Digital Hierarchy signal, or (ix) an Optical Channel signal.

3. A method as claimed in claim 1, wherein receiving one or more data payloads comprises receiving the client signal and creating the one or more data payloads based on the client signal that was received.

4. A method as claimed in claim 1, wherein encrypting each payload of the one or more data payloads comprises encrypting using one of an Advanced Encryption Standard (AES) based transform or a Data Encryption Standard (DES) based transform.

5. A method as claimed in claim 4, wherein the set of security control parameters comprises a current Initialization Vector (IV) and a current key index, wherein the current key index identifies a shared key capable of use for both encryption and decryption.

6. A method as claimed in claim 1, wherein each frame of the data frames in the data super frame comprises a digital wrapper, and wherein each different set of unused bytes associated with each different frame of the data frames comprise different designated bytes within the digital wrapper of the each different frame.

7. A method as claimed in claim 1, wherein each frame of the data frames in the data super frame is followed by at least one idle word that comprises four unused bytes, and wherein each different set of unused bytes associated with each different frame of the data frames are four unused bytes in an idle word that follows the each different frame.

8. A method as claimed in claim 1, wherein the client signal comprises two or more client signal frames comprising two or more data payloads, wherein the client signal further comprises an idle space between each of the two or more client signal frames, and wherein the unused bytes in the data super frame correspond to at least part of the idle space between a particular two or more client signal frames.

9. A non-transitory computer-readable medium carrying instructions, the instructions when executed by one or more processors, cause the one or more processors to:
create a data super frame that comprises two or more data frames, wherein each frame of the data frames contains a payload portion;
receive one or more data payloads that are associated with a client signal;
encrypt each payload of the one or more data payloads using a single set of security control parameters;
store each encrypted payload in a payload portion of a different frame of the data frames in the data super frame;
associate each different frame of the data frames with a different set of unused bytes in the data super frame; and
store different members of the set of security control parameters in different sets of unused bytes associated with at least two different frames of the data frames.

10. A non-transitory computer-readable medium as claimed in claim 9, wherein the client signal is one of (i) a frame relay signal, (ii) an Asynchronous Transfer Mode signal, (iii) an Ethernet signal, (iv) a Fiber Channel signal, (v) a Time Division Multiplexing signal, (vi) an Internet Protocol signal, (vii) a Synchronous Optical Network signal, (viii) a Synchronous Digital Hierarchy signal, or (ix) an Optical Channel signal.

11. A non-transitory computer-readable medium as claimed in claim 9, wherein the instructions, when executed by one or more processors, cause the one or more processors to receive the one or more data payloads by receiving the client signal and creating the one or more data payloads based on the client signal that was received.

12. A non-transitory computer-readable medium as claimed in claim 9, wherein encrypting each payload of the one or more data payloads comprises encrypting using one of an Advanced Encryption Standard (AES) based transform or a Data Encryption Standard (DES) based transform.

13. A non-transitory computer-readable medium as claimed in claim 12, wherein the set of cryptographic parameters comprises a current Initialization Vector (IV) and a current key index, wherein the current key index identifies a shared key capable of use for both encryption and decryption.

14. A non-transitory computer-readable medium as claimed in claim 9, wherein each frame of the data frames in the data super frame comprises a digital wrapper, and wherein each different set of unused bytes associated with each different frame of the data frames comprise different designated bytes within the digital wrapper of the each different frame.

15. A non-transitory computer-readable medium as claimed in claim 9, wherein each frame of the data frames in the data super frame is followed by at least one idle word that comprises four unused bytes, and wherein each different set of unused bytes associated with each different frame of the data frames are four unused bytes in an idle word that follows the each different frame.

16. A non-transitory computer-readable medium as claimed in claim 9, wherein the client signal comprises two or more client signal frames comprising two or more data payloads, wherein the client signal further comprises an idle space between each of the two or more client signal frames, and wherein the unused bytes in the data super frame correspond to at least part of the idle space between a particular two or more client signal frames.

17. A system comprising:
a networking apparatus;
logic coupled to the networking apparatus, wherein the logic when executed is operable to:
create a data super frame that comprises two or more data frames, wherein each frame of the data frames contains a payload portion;
receive one or more data payloads that are associated with a client signal;
encrypt each payload of the one or more data payloads using a single set of security control parameters;
store each encrypted payload in a payload portion of a different frame of the data frames in the data super frame;
associate each different frame of the data frames with a different set of unused bytes in the data super frame; and
store different members of the set of security control parameters in different sets of unused bytes associated with at least two different frames of the data frames.

18. A system as claimed in claim 17, wherein the client signal is one of (i) a frame relay signal, (ii) an Asynchronous Transfer Mode signal, (iii) an Ethernet signal, (iv) a Fiber Channel signal, (v) a Time Division Multiplexing signal, (vi) an Internet Protocol signal, (vii) a Synchronous Optical Network signal, (viii) a Synchronous Digital Hierarchy signal, or (ix) an Optical Channel signal.

19. A system as claimed in claim 17, wherein the logic, when executed, is operable to receive one or more data payloads comprises receiving the client signal and creating the one or more data payloads based on the client signal that was received.

20. A system as claimed in claim 17, wherein the logic, when executed, is operable to encrypt each payload of the one or more data payloads comprises encrypting using one of an Advanced Encryption Standard (AES) based transform or a Data Encryption Standard (DES) based transform.

21. A system as claimed in claim 17, wherein the set of security control parameters comprises a current Initialization Vector (IV) and a current key index, wherein the current key index identifies a shared key capable of use for both encryption and decryption.

22. A system as claimed in claim 17, wherein each frame of the data frames in the data super frame comprises a digital wrapper, and wherein each different set of unused bytes associated with each different frame of the data frames comprise different designated bytes within the digital wrapper of the each different frame.

23. A system as claimed in claim 17, wherein each frame of the data frames in the data super frame is followed by at least one idle word that comprises four unused bytes, and wherein each different set of unused bytes associated with each different frame of the data frames are four unused bytes in an idle word that follows the each different frame.

24. A system as claimed in claim 17, wherein the client signal comprises two or more client signal frames comprising two or more data payloads, wherein the client signal further comprises an idle space between each of the two or more client signal frames, and wherein the unused bytes in the data super frame correspond to at least part of the idle space between a particular two or more client signal frames.

* * * * *